E. M. GRAHAM.
Cultivators.
No. 139,001.
Patented May 20, 1873.
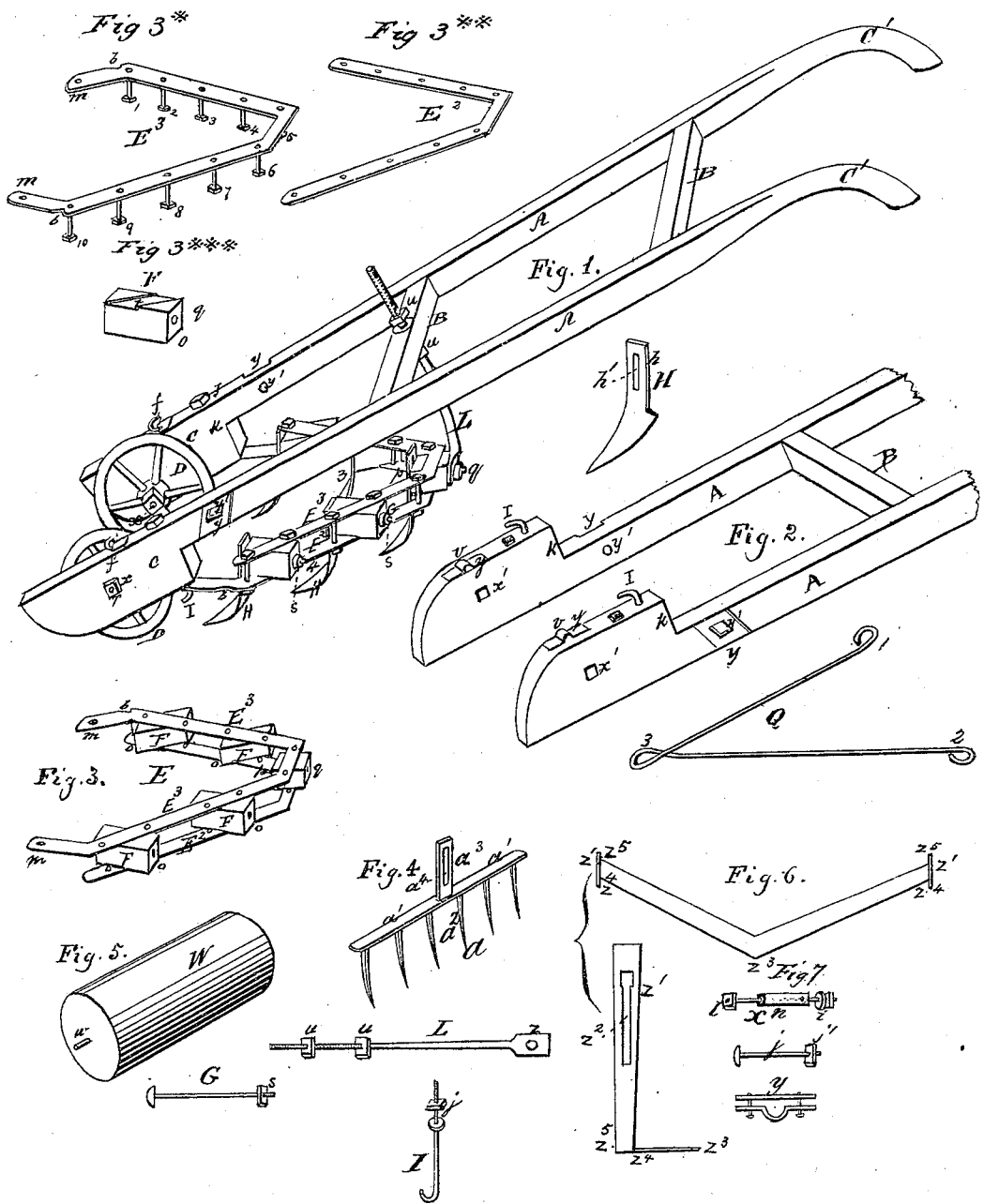
Witnesses:
W. A. Dangerfield
T. H. Upperman
Inventor:
E. M. Graham
by Colborne Brookes & Comp'y
attornies

UNITED STATES PATENT OFFICE.

EVANDER M. GRAHAM, OF VERNON, LOUISIANA.

IMPROVEMENT IN CULTIVATORS.

Specification forming part of Letters Patent No. 139,001, dated May 20, 1873; application filed May 16, 1872.

*To all whom it may concern:*

Be it known that I, EVANDER M. GRAHAM, of Vernon, in the parish of Jackson and State of Louisiana, have invented certain Improvements in Machinery for Plowing, Raking, Rolling, Harrowing, and Scraping land, of which the following is a specification:

The object of my invention is the production of a machine capable of being used by hand, or with horse or other animal power, having interchangeable parts, whereby the operations of plowing, raking, rolling, harrowing, or scraping may be performed at separate times, or one or more of the said operations may be effected at the same time by arranging the interchangeable parts accordingly. But that my invention may be fully understood, I will proceed to describe the same in detail by aid of the accompanying drawing.

Description of the Drawing.

Figure 1 represents a side view of the machine, with various parts in position for use. Fig. 2 represents a perspective view of the stock or frame A B, inverted. Fig. 3 is a perspective view of the rack or frame E to which the plow attachments are fastened. Fig. 4 is a perspective view of the rake $a$. Fig. 5 represents a cylinder or roller, M, to be applied to the apparatus when required. Fig. 6 represents a side view and plan of the scraper Q. Fig. 7 shows one of the axles $x$ separately.

Some of the other details of the apparatus are shown separately, and are indicated by the same letters of reference employed and described in the main views.

A A are long arms, held firmly together by cross-bars B B, which, with the arms A A, constitute the main frame of the apparatus. The arms A A are formed broader at C C, to give strength for the support and arrangement of the various parts to be attached to the apparatus, and to give room for the raising and lowering of the rack or frame E supporting the plows H H. D D are supporting-wheels, which revolve on axles $x x$, carried by the enlargement C of the main framing A, one of which is shown separately, Fig. 7. The axles $x x$ are formed round at $i$, and square at $n$. The square part $n$ is inserted in the holes $x'$ in the enlargement C, and they are retained in position by the nuts $l$. The wheels D D are supported on the inside of the enlargement C, and are held in position as close as possible to the enlargement C, so as to revolve as near as possible to without touching the same, by means of nuts and washers, as shown at $r$; by this means it will be seen that the wheels D D may be readily removed at pleasure. Fig. 3* and Fig. 3 and Fig. 3* represent detailed views of the various parts of the rack or frame for supporting the plows, shown separately at Fig. 3. $E^2$ and $E^3$ represent the top and bottom bars, which, by means of the bolts and nuts 1 2 3 4 5 6 7 8 9 10, passing through holes in the bars $E^2$ and $E^3$, retain the oblong blocks F correctly in position, as shown in Fig. 3. The sides of the blocks F F are formed parallel on the top, and bottom sides are grooved, as represented at $t$, Fig. 3***, in which the bars $E^2 E^3$ rest when the blocks F are in position. The bolts 1 2 3 4 5 6 7 8 9 10 are so arranged that the blocks may be inserted at equal or varying distances from each other, as desired, according to the number, description, and size of the plows U. The blocks F are formed with holes $o$ $o$ through the center of the same for the purpose of receiving the rod G, which passes through the slot $h'$ in the shank $h$ of the plow H, or other cultivating attachment, and then through the hole $o$ in the block F, and they are retained securely in position by the nuts $s$, as shown in Fig. 1; the shanks $h$ of the plows H having elongated slots $h'$ therein, for the purpose of enabling such plows to be raised or lowered to vary the depths of furrow. I I are bolts with hook-shaped ends, which pass up from the under side of and through the arms A A at K, and are retained in position by nuts and washers $j$. To these hooks the rack E, Fig. 3, is attached by passing the hooks through the hole $m$ $m$ in the bar $E^3$, as shown in Fig. 1. L is a rod, one end of which is attached to the rack of $q$ by means of one of the bolts G, which passes through the loop $z$ in the rod L, while the other end of the rod L passes through a hole in one of the cross-bars B, having nuts $u$ $u$, one above and the other below the cross-bar D. W, Fig. 5, represents a roller, which may be attached to the frame A, when required, in place of the wheels D D. When employing roller W, the wheels D D and axles $x$ $x$ are removed, and the roller W is attached on the under side of the enlargement C, at $v$ $v$, by means of short axles $w$ $w$, firmly fixed in each end of the roller W. Y Y are bearings for the axles $w$ $w$, which are formed of two thin plates held together by small screws passing through such plates and into the enlargements $c$ $c$ at $v$. One of the plates Y is so grooved or bent as to form a round hole, as shown, in which the axles $w$ $w$ of the roller W are placed and revolve. The roller W is easily attached or removed by removing one of the screws $y$, which should be replaced after attaching or removing the said roller. The roller W may also be used for mashing the clods, smoothing the ground, and pressing the soil, or seed when sown. $a$, Fig. 4, represents a rake, which may be attached to the apparatus at $p$. The rake $a$ consists of a flat bar, $a^1$, having teeth $a^2$ formed on or affixed thereto, and having an upright shank, $a^3$, with a slot, $a^4$, therein, by means of which and the bolt $q$ the rake $a$ may be attached at any desired height to the rack E at $p$. When employing the rake $a$ the plows H are removed. Z, Fig. 6, represents a scraper, which consists of a thin angular bar, having at each end upright shanks $Z^1$ $Z^1$, with slots $Z^2$ $Z^2$ formed therein to receive bolts for the purpose of attaching the scraper Z to the frame A. The scraper Z is formed with sharp edges from the point $Z^3$ to the points $Z^4$ $Z^4$. When it is required to employ the scraper Z the plows H are removed, the upright shanks $Z^1$ $Z^1$ are placed in grooves $y$ on the arms A, in position so that the sharp edges $Z^3$ $Z^4$ $Z^3$ $Z^4$ are in a direction immediately between and just in the rear of the wheels D D, the back part $Z^5$ $Z^5$ of the scraper Z resting in notches $b$ $b$ formed in the upper bar $E^3$, shown in Figs. 1, 3, and 3*, and when so placed are retained firmly in position by bolts J, which pass through the slots $Z^2$ in the shanks $Z^1$, and through the holes $y'$ $y'$ in the frame A, and the bolts J are fastened on the inside of the frame A by nuts J. The scraper Z is set so that it shall just cut under the surface of the ground to clear the same of weeds and grass, the sharp point $Z^3$ and angular edges $Z^3$ $Z^4$ serving to clear the scraper Z of roots, and at the same time cuts a space equal to the width of the frame A B. The rake $a$ and the scraper Z may be attached and used at the same time. Q is a triangular draft-bar, to be used when employing horses or other draft-animals, and is formed with loops 1 2 3. The loops 1 2 are attached to the hooks $f$ $f$ affixed to the top of the arms A, and the draft-chain is fastened to the loop 3.

When using the apparatus the handles $C^1$ $C^1$ are held by the operator in a position just above the hips.

When employing the apparatus as arranged in Fig. 1, between rows of crops, the first furrows made by the plows will be those nearest to the crop on each side, and these furrows will be immediately filled by the next plows 3 4, Fig. 1, and the furrow made by the plows 3 4 will be filled in by the plow affixed in the center at $p$, so that only one furrow will be left unfilled, and that in the center of the row. By removing the plow at $p$, Fig. 1, both sides of the row may be plowed at once when the crops are small. By using right and left handed turning-plows and raising the plow at $p$ a little above the others, a bed may be thrown up and opened at the same time.

By employing right or left handed plows the earth may be thrown to or from the rows at pleasure.

In covering seed the rake $a$ and roller W may be attached at the same time, in which case the direction of motion of the apparatus is reversed. By so doing the rake $a$ will gently cover up the seed with soil, and the roller will press it down. A space equal to the width of the machine can be plowed, raked, rolled, or scraped by going over the ground once, or two or more operations may be effected at the same time.

Any number of plows from one to five may be used with the apparatus, as shown in Fig. 1, and by employing additional blocks F any number up to ten may be used; and by attaching teeth in the same manner as the plows are attached, a harrow may be formed.

The apparatus may be employed as a rake by attaching the rack E to the frame A B and affixing the rake $a$ in position at $p$; in this case the wheels D will be employed. In other cases the apparatus may be employed as a combined roller and harrow by removing the wheels D and substituting the roller W and affixing harrow-points to the blocks F of the rack E.

Having thus described my invention, I would have it understood that what I claim, and desire to secure by Letters Patent, is—

1. The combination of the frame A B, wheels D, axles $x$, hooks I, rod L, and rack or frame E, adapted to receive plows H or other cultivating devices, substantially as shown and described.

2. The combination of the bars $E^2$ $E^3$, bolts and nuts 1 2 3 4 5 6 7 8 9 10, and blocks F with the frame A B, substantially as shown and described.

3. The grooves $y$ in the frame A B, in combination with the notches $b$ in the rack or frame E, substantially as and for the purpose described and set forth.

EVANDER M. GRAHAM.

Witnesses:
H. P. SMITH,
W. H. COE.